(12) United States Patent
Suzuki et al.

(10) Patent No.: US 7,923,119 B2
(45) Date of Patent: Apr. 12, 2011

(54) MULTILAYER FILM FOR TOP-SEAL

(75) Inventors: Eisuke Suzuki, Tokyo (JP); Akinori Takeda, Tokyo (JP)

(73) Assignee: Asahi Kasei Life and Living Corporation, Tokyo (JP)

( * ) Notice: Subject to any disclaimer, the term of this patent is extended or adjusted under 35 U.S.C. 154(b) by 1246 days.

(21) Appl. No.: 11/520,039

(22) Filed: Sep. 13, 2006

(65) Prior Publication Data
US 2007/0092748 A1 Apr. 26, 2007

(30) Foreign Application Priority Data

Sep. 13, 2005 (JP) ................................ P.2005-265703

(51) Int. Cl.
*B32B 27/00* (2006.01)
*B65B 7/00* (2006.01)
(52) U.S. Cl. ........................... 428/500; 428/515; 53/285
(58) Field of Classification Search ........................ None
See application file for complete search history.

(56) References Cited

U.S. PATENT DOCUMENTS 6,032,800 A * 3/2000 Kocher ...................... 206/459.5
6,544,910 B2 * 4/2003 Himmelsbach et al. ...... 442/150

* cited by examiner

*Primary Examiner* — Sheeba Ahmed
(74) *Attorney, Agent, or Firm* — Staas & Halsey LLP

(57) ABSTRACT

The present invention provides: a multilayer film for top-seal to be used for a tray having a surface layer containing a polystyrene-based resin, the multilayer film at least having a first layer and a second layer, the first layer containing 50% by weight or more of at least one selected from the group consisting of (a) a copolymer including a conjugated diene and a vinyl aromatic compound; (b) a copolymer resulting from hydrogenation of a copolymer including a conjugated diene and a vinyl aromatic compound; (c) a combined resin of: a hydrogenated product of a copolymer including a conjugated diene and a vinyl aromatic compound; and an $\alpha$-olefin copolymer; (d) a mixture of: a combined resin of: a hydrogenated product of a copolymer including a conjugated diene and a vinyl aromatic compound; and an $\alpha$-olefin copolymer, and an ethylene-$\alpha$-olefin copolymer, and (e) a mixture of: a combined resin of: a hydrogenated product of a copolymer including a conjugated diene and a vinyl aromatic compound; and an $\alpha$-olefin copolymer, and a branched low-density polyethylene, the multilayer film having: a gel fraction of from 0.5 to 50% by weight; a thickness of 70 $\mu$M or less; a tensile modulus of from 40 to 300 MPa in any direction; and a thermal shrinkage ratio at 200° F. of from 15 to 75% in any direction; a packaged body using the multilayer film; and a process for producing the multilayer film.

14 Claims, 1 Drawing Sheet

MULTILAYER FILM FOR TOP-SEAL

FIELD OF THE INVENTION

The present invention relates to a multilayer film to be used for top-seal (also known as case-ready packaging). In particular, the invention relates to a multilayer film for top-seal to be used together with a tray having a surface layer containing a polystyrene-based resin for the purpose of storing, transporting, and selling foods; a packaged body using the multilayer film; and a process for producing the multilayer film.

BACKGROUND OF THE INVENTION

Hitherto, for packaging with trays made of various materials, stretch-packaging shrink-packaging, and the like using packaging films has been employed. In the stretch-packaging, since a tray is packaged with stretching the film, the packaging has a characteristic that the film is not loosen and thus a good package appearance can be maintained even after the resulting packaged body is transported. Moreover, in the shrink-packaging, particularly pillow shrink-packaging, an article to be packaged is generally packaged by the following method. Namely, after an article to be packaged, such as a food placed in a tray is loosely packaged with a film with a margin independent of the shape and size of the article to be packaged, center sealing is conducted toward the film on the backside of the packaged body by a rotating roller thermal fusion method, further the film before and after the tray is sealed by a seal-and-cut method, and then heat is applied to the packaged body for an extremely short period in a thermal shrinking tunnel to shrink the film, whereby the article to be packaged is rapidly and tightly packaged. Therefore, in the pillow shrink-packaging, it is possible to package several kinds of trays without changing the width of the film for packaging trays. As a result, the pillow shrink-packaging has characteristics that laborsaving in the packaging step is possible and the packaging speed can be also accelerated as compared with the stretch-packaging.

However, in any of the above packaging methods, the whole content including a tray is packaged. Therefore, in the above packaging method, in the case that rough transportation is performed at the time when a raw meat or the like is packaged, for example, there arises a problem that meat juice may seep into the backside of the tray and hence hygiene is not maintained when the packaged body is turned upside down.

As a method capable of solving problems in such stretch-packaging and shrink-packaging, there is a top-seal packaging wherein a tray and a film is adhered or fused at a circumferential edge part of the upper face of the tray and thereby the tray is sealed. In this method, since the circumferential edge part of the upper face of the tray is surely adhered or fused for sealing, the seeping of the water and oil coming from its content such as a raw meat into the backside of the tray and the leakage of the water and oil do not occur. The quantity of the film to be used is also small as compared with the stretch-packaging or shrink-packaging. Thus, since it is possible to reduce the quantity of packaging material, it is an effective means for waste reduction.

However, in the case that a tray made of a polystyrene-based resin as a raw material is sealed by the top-seal packaging, it is impossible to seal the tray with a commonly employed film using an olefinic resin as a surface layer since the film is not fused to any of a hard tray and a foam tray. Therefore, there is a case that the tray is transformed into a multilayer one or is coated and thus a multilayer tray wherein an olefinic resin layer is arranged on the sealing part of the tray is used. However, in such a tray, since a polyolefin resin is laminated or coated on a polystyrene layer in the production step of the tray, not only the production step becomes vexatious but also loss generated in the production step is difficult to recycle and reuse since the loss is a mixture of two or more kinds of raw materials. There is a method of applying an adhesive to the circumferential edge part of the tray but, as is similar to the case mentioned above, the production step of the tray becomes vexatious and recycle and reuse thereof becomes difficult.

Against these problems, Document 1 discloses a stretch film wherein a layer mainly composed of an ethylene-based resin and/or an ethylene-α-olefin copolymer and a layer composed of at least two polymer blocks mainly made of vinyl aromatic compounds and at least one polymer block mainly made of a conjugated diene are arranged on the surface layer, respectively.

However, the stretch film is insufficient in sealing property in a state that the content is heaped on the tray beyond the height of the tray, particularly intervening material sealing property. After the packaging, when several to several dozen pieces of packaged bodies are packed in a cardboard box in layers, the packaged bodies in lower layer, particularly the packaged bodies in the lowest layer are dented since pressure is applied to the content owing to the weight of the upper layer(s), so that the film surrounding the dented part is loosed. The loosed film results in bad appearance and lowers its merchantability at the store.

[Document 1] JP-A-10-180951

SUMMARY OF THE INVENTION

An object of the invention is to provide a film, which can seal a tray having a surface layer containing a polystyrene-based resin, particularly a foam tray using a polystyrene-based resin as a starting material, which does not induce tear or seal-peeling at package handling during transportation or during storage after transportation and which simultaneously satisfies a good package appearance, as well as a process for producing the same. In particular, an object of the invention is to provide a film which satisfies a sealing property in a state that the article to be packaged is heaped on the tray beyond the height of the tray, an antitear property, and a good package appearance at the same time, as well as a process for producing the same.

Incidentally, in the case that the article to be packaged is a processed food such as daily dish or a meat, especially a poultry raw meat, water, oil, or a water-oil mixture is apt to be attached to a circumferential edge part of the tray and the attachment may cause a decrease in sealing property. It is also an object of the invention to provide a film for top-seal which exhibits a good sealing property even when these intervening materials are present and thus induces no liquid leakage owing to these intervening materials.

The present inventors have made eager investigation to examine the problem. As a result, it has been found that the foregoing objects can be achieved by the following multilayer film and the following process for producing the multilayer film. With this finding, the present invention is accomplished.

1. A multilayer film for top-seal to be used for a tray having a surface layer containing a polystyrene-based resin, the multilayer film at least comprising a first layer and a second layer, the first layer containing 50% by weight or more of at least one selected from the group consisting of: (a) a copolymer comprising a conjugated diene and a vinyl aromatic compound; (b) a copolymer resulting from hydrogenation of a copolymer comprising a conjugated diene and a vinyl aromatic compound; (c) a combined resin of a hydrogenated product of a copolymer comprising a conjugated diene and a vinyl aromatic compound; and an α-olefin copolymer; (d) a mixture of: a combined resin of: a hydrogenated product of a copolymer comprising a conjugated diene and a vinyl aromatic compound; and an α-olefin copolymer; and an ethylene-α-olefin copolymer; and (e) a mixture of, a combined resin of: a hydrogenated product of a copolymer comprising a conjugated diene and a vinyl aromatic compound; and an α-olefin copolymer, and a branched low-density polyethylene, the multilayer film having: a gel fraction of from 0.5 to 50% by weight; a thickness of 70 μm or less; a tensile modulus of from 40 to 300 MPa in any direction; and a thermal shrinkage ratio at 200° F. of from 15 to 75% in any direction.

2. The multilayer film according to item 1, wherein the second layer contains 50% by weight or more of at least one selected from the group consisting of: a high-density polyethylene; a medium-density polyethylene; a branched low-density polyethylene; an ethylene-α-olefin copolymer; a metal partially neutralized product of ethylene-methacrylic acid copolymer, an ethylene-vinyl acetate copolymer; a polypropylene-based polymer, and a polypropylene-based terpolymer.

3. The multilayer film according to item 1, which contains, between the first layer and the second layer, at least one layer of third layer containing 50% by weight or more of at least one selected from the group consisting of: a copolymer comprising a conjugated diene and a vinylaromatic compound; an ethylene-vinyl acetate copolymer; an ethylene-methylmethacrylic acid copolymer; a metal partially neutralized product of ethylene-methacrylic acid copolymer; an ethylene-acrylic acid copolymer; an ethylene-ethylacrylic acid copolymer, an ethylene-maleic anhydride copolymer; an ethylene-ethylene acrylate-maleic anhydride copolymer, an ethylene-maleic acid modified resin; an ethylene-α-olefin copolymer having a Vicat softening temperature of 50 to 68° C.; a polypropylene-based polymer, and a polypropylene-based terpolymer.

4. The multilayer film according to item 2, which contains, between the first layer and the second layer, at least one layer of third layer containing 50% by weight or more of at least one selected from the group consisting of: a copolymer comprising a conjugated diene and a vinylaromatic compound; an ethylene-vinyl acetate copolymer; an ethylene-methylmethacrylic acid copolymer, a metal partially neutralized product of ethylene-methacrylic acid copolymer, an ethylene-acrylic acid copolymer; an ethylene-ethylacrylic acid copolymer; an ethylene-maleic anhydride copolymer, an ethylene-ethylene acrylate-maleic anhydride copolymer, an ethylene-maleic acid modified resin; an ethylene-α-olefin copolymer having a Vicat softening temperature of 50 to 68° C.; a polypropylene-based polymer; and a polypropylene-based terpolymer.

5. The multilayer film according to item 1, wherein the first layer contains a polystyrene-based resin and the sum of styrene component of the first layer is 60% by weight or more.

6. The multilayer film according to item 1, which contains at least one additive selected from the group consisting of: a glycerin; a fatty acid; a polyhydric alcohol fatty acid ester, a talc; an oleate salt, an amide-based lubricant; and a mineral oil having a number-average molecular weight of 250 to 480.

7. The multilayer film according to item 4, which contains at least one additive selected from the group consisting of: a glycerin; a fatty acid; a polyhydric alcohol fatty acid ester, a talc; an oleate salt, an amide-based lubricant; and a mineral oil having a number-average molecular weight of 250 to 480.

8. The multilayer film according to item 1, wherein the first layer has a gel fraction of from 0.5 to 15% by weight.

9. The multilayer film according to item 2, wherein the first layer has a gel fraction of from 0.5 to 15% by weight.

10. The multilayer film according to item 4, wherein the first layer has a gel function of from 0.5 to 15% by weight.

11. The multilayer film according to item 6, wherein the first layer has a gel fraction of from 0.5 to 15% by weight.

12. The multilayer film according to item 7, wherein the first layer has a gel fraction of from 0.5 to 15% by weight.

13. The multilayer film according to any one of items 1, 8, 11, and 12, which is used for top-seal packaging of a hard tray or a foam tray each having a surface layer containing a polystyrene-based resin, the tray contains at least one of processed foods and poultry raw meats.

14. A packaged body comprising: a tray having a surface layer containing a polystyrene-based resin; and the multilayer film according to any one of items 1, 8, 10, and 12, the tray being top-sealed with the multilayer film.

15. The packaged body according to item 14, wherein the packaged body packages at least one of processed foods and raw meats.

16. A process for producing a multilayer film comprising: forming a tubular parison by co-extruding: a first layer containing 50% by weight or more of at least one selected from the group consisting of: (a) a copolymer comprising a conjugated diene and a vinyl aromatic compound; (b) a copolymer resulting from hydrogenation of a copolymer comprising a conjugated diene and a vinyl aromatic compound; (c) a combined resin of: a hydrogenated product of a copolymer comprising a conjugated diene and a vinyl aromatic compound; and an α-olefin copolymer, (d) a mixture of: a combined resin of: a hydrogenated product of a copolymer comprising a conjugated diene and a vinyl aromatic compound; and an α-olefin copolymer, and an ethylene-α-olefin copolymer; and (e) a mixture of a combined resin of: a hydrogenated product of a copolymer comprising a conjugated diene and a vinyl aromatic compound; and an α-olefin copolymer; and a branched low-density polyethylene; a second layer containing 50% by weight or more of at least one selected from the group consisting of: a high-density polyethylene; a medium-density polyethylene; a branched low-density polyethylene; an ethylene-α-olefin copolymer; a metal partially neutralized product of ethylene-methacrylic acid copolymer; an ethylene-vinyl acetate copolymer; a polypropylene-based polymer, and a polypropylene-based terpolymer; and a third layer containing 50% by weight or more of at least one selected from the group consisting of: a copolymer comprising a conjugated diene and a vinylaromatic compound; an ethylene-vinyl acetate copolymer, an ethylene-methylmethacrylic acid copolymer; a metal partially neutralized product of ethylene-methacrylic acid copolymer, an ethylene-acrylic acid copolymer; an ethylene-ethylacrylic acid copolymer; an ethylene-maleic anhydride copolymer; an ethylene-ethylene acrylate-maleic anhydride copolymer, an ethylene-maleic acid modified resin; an ethylene-α-olefin copolymer having a Vicat softening temperature of 50 to 68° C.; a polypropylene-based polymer; and a polypropylene-based terpolymer, so as to at least one layer of the third layer being between the first layer and the second layer; cooling the tubular parison; subjecting the tubular parison to irradiation with an electron beam from a side of the first layer at 15 to 150 kGy so as to the tubular parison having a gel fraction of from 0.5 to 50% by weight; and stretching the tubular parison by a double bubble inflation method so as to a stretching magnification being from 1.5 to 10, the temperature at a stretch-stating point being from 70 to 140° C.

The use of the multilayer film of the invention enables packaging of a tray having a surface layer containing a polystyrene-based resin by a top-seal packaging method. Furthermore, the packaged body using the multilayer film of the invention has a good sealing strength against impacts resulting from package handling during storage and transportation process after packaging. As a result, it is possible to obtain a packaged body capable of suppressing generation of tear in the film and maintaining a good appearance, e.g., extremely less looseness of the film when the packaged body is placed at the store after transportation. In particular, the packaged body using the multilayer film of the invention exhibits a good sealing property at the time when the article to be packaged having a height higher than that of the above tray is subjected to top-seal packaging, i.e., top-sealing is performed in a heaped state and also has a good package appearance.

Moreover, at the time when top-seal packaging is performed using processed foods and raw meats, particularly poultry raw meats such as chicken meat as articles to be packaged, water, oil, or a water-oil mixture is apt to be attached to a circumferential edge part of the above tray during the packaging step. The packaged body using the multilayer film of the invention can prevent generation of liquid leakage even in a state that these intervening materials are present and thus enables a good sealing.

The multilayer film of the invention can be suitably utilized as a film for top-seal packaging. In particular, it is suitable as a top-seal packaged body for processed foods and raw meats, particularly processed foods and poultry raw meats such as chicken meat using trays containing a polystyrene-based resin in the surface layer.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE INVENTION

Figure 1A:
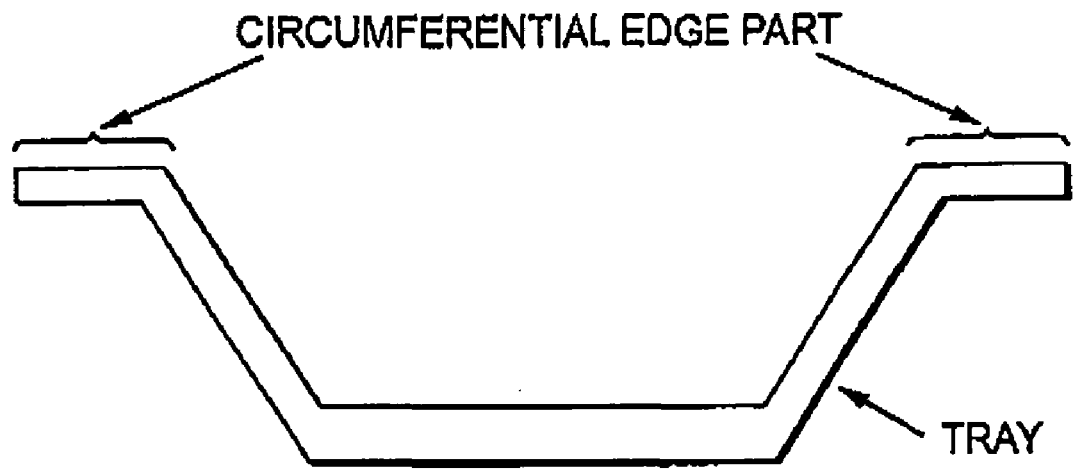
FIG. 1A. is a cross-sectional view of one embodiment of the tray of the present invention.
Figure 1B:
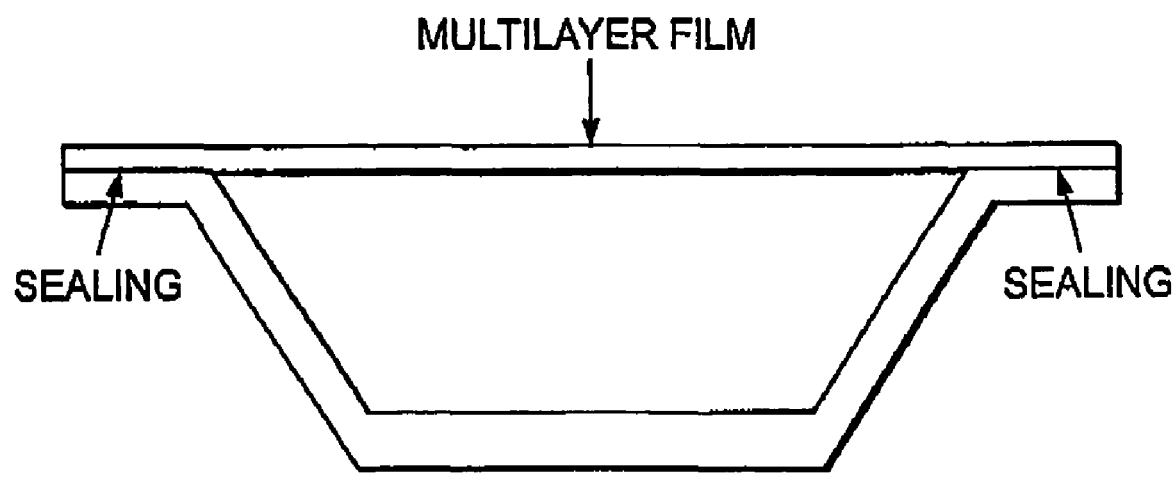
FIG. 1B is a cross-sectional view of one embodiment of the packaged body of the present invention.

The following will describe the present invention, particularly preferable embodiments thereof in detail.

The invention relates to a multilayer film for top-seal to be used for a tray having a surface layer containing a polystyrene-based resin.

As the tray having a surface layer containing a polystyrene-based resin, there may be mentioned hard trays, foam trays, and the like trays having a surface layer containing a polystyrene-based resin. As specific forms of the trays, there may be mentioned hard trays and foam trays comprising a polystyrene-based resin as a main starting material; trays wherein a polystyrene-based resin is laminated on a sealing surface of a hard body or foam body formed of a starting material other than a polystyrene-based resin; or the like trays.

In the invention, the "top-seal packaging" is a packaging method wherein a content is hermetically closed by sealing a circumferential edge part of a tray with a film as a capping material by a means such as thermal fusion or impulse sealing. As the above polystyrene-based resin which is a material for the tray, there may be mentioned homopolymers of styrene-based compounds; copolymers of two or more styrene-based compounds; rubber-modified styrene resins obtained by dispersing a rubbery polymer in matrices formed of the styrene-based compounds; and the like. They may be used singly or mixtures of two or more thereof may be suitably used. Moreover, into the tray, a pigment, a recycle material, the other thermoplastic resin, and the like may be incorporated. The recycle material herein means a material obtained by subjecting a film loss part formed during the film production step or packaging step to a cutting treatment or a treatment such as pelletization, followed by processing so as to be re-usable.

The multilayer film of the invention at least comprises a first layer and a second layer. Hereinafter, the first layer is referred to as "surface layer (1)" and the second layer as "surface layer (2)".

In the invention, the above specific resin component is used for the surface layer (1) and gel fraction of the whole film is specified. The use of the surface layer (1) so as to come into contact with the tray enhances the sealing property with the tray, particularly the sealing property in the presence of intervening materials, and the sealing property in a state that the article to be packaged is heaped beyond the upper face of the tray, and can prevent tear of the film or seal-peeling by impact, which is induced at package handling during transportation, after transportation, or during storage of the packaged body using the film.

The surface layer (1) of the invention contains 50% by weight or more of at least one selected from the group consisting of: (a) a copolymer comprising a conjugated diene and a vinyl aromatic compound; (b) a copolymer resulting from hydrogenation of a copolymer comprising a conjugated diene and a vinyl aromatic compound; (c) a combined resin of: a hydrogenated product of a copolymer comprising a conjugated diene and a vinyl aromatic compound; and an α-olefin copolymer; (d) a mature of: a combined resin of: a hydrogenated product of a copolymer comprising a conjugated diene and a vinyl aromatic compound; and an α-olefin copolymer; and an ethylene-α-olefin copolymer; and (e) a mixture of: a combined resin of: a hydrogenated product of a copolymer comprising a conjugated diene and a vinyl aromatic compound; and an α-olefin copolymer; and a branched low-density polyethylene.

In the copolymer (a) comprising a conjugated diene and a vinyl aromatic compound to be used for the surface layer (1) of the invention, the content of the vinyl aromatic compound is not particularly limited. The content of the copolymer (a) is preferably 50% by weight or more relative to the surface layer (1) in view of film formation and is preferably 95% by weight or more in view of sealing property in a heaped state. More preferred is 60% by weight or more and 85% by weight or less.

The conjugated diene means an olefinic unsaturated conjugate double bond-containing compound and there may be, for example, mentioned 1,3-butadiene, 2-methyl-1,3-butadiene, 2,3-dimethyl-1,3-butadiene, 1,3-pentadiene, 2-methyl-1,3-butadiene, 1,3-hexadiene, and the like. They may be used singly or two or more thereof may be used.

The vinyl aromatic compound means a compound having a vinyl bond and having an aromatic group in the side chain and there may be, for example, mentioned styrene, o-methylstyrene, p-methylstyrene, m-methylstyrene, α-methylstyrene, ethylstyrene, α-methyl-p-methylstyrene, 2,4-dimethylstyrene, monochlorostyrene, p-methylstyrene, p-tert-butylstyrene, α-ethylstyrene, and the like. They may be used singly or two or more thereof may be used.

As the copolymer of the above (a) of the invention, there may be mentioned (1) a random copolymer of a conjugated diene and a vinyl aromatic compound, (2) a block copolymer comprising a conjugated diene block and a vinyl aromatic block, (3) a block copolymer comprising a vinyl aromatic compound block and a conjugated diene vinyl aromatic compound copolymer block, (4) a block copolymer comprising a vinyl aromatic block, a conjugated diene-vinyl aromatic compound polymer block, and a conjugated diene block, and the like.

As the block copolymer of the above (3), there may be mentioned a block copolymer wherein the vinyl aromatic compound blocks are present at both terminal ends, a block copolymer wherein the vinyl aromatic compound block is present at one terminal end, or the like.

As the block copolymer of the above (4), there may be mentioned a block copolymer comprising the vinyl aromatic block at one terminal ends and a conjugated diene block at another terminal end, or the like.

As the conjugated diene-vinyl aromatic compound polymer block, there may be mentioned one wherein a conjugated diene and a vinyl aromatic compound are randomly present, one wherein the vinyl aromatic compound is present in a tapered state that the compound gradually increases. Of these structures. In the multilayer film of the invention, any of the structures can be employed. In particular, in the case that a film sliding property is required, it is suitable to use a block copolymer comprising a vinyl aromatic compound block and a conjugated diene-vinyl aromatic compound copolymer block. Furthermore, among the block copolymers comprising a vinyl aromatic compound block and a conjugated diene-vinyl aromatic compound copolymer block, one wherein the vinyl aromatic compound in the conjugated diene-vinyl aromatic compound copolymer block is present in a tapered state that the compound gradually increases.

The weight-average molecular weight of the copolymer of the above (a) for use in the invention is not particularly limited but is preferably from 20,000 to 600,000, more preferably from 20,000 to 400,000, further preferably from 80,000 to 300,000. The weight-average molecular weight of the copolymer of the above (a) is preferably 20,000 or more in view of film-forming performance and is preferably 600,000 or less in view of extrusion performance. The molecular weight distribution is preferably 10.0 or less, more preferably from 1.1 to 5.0, further preferably from 1.1 to 4.0 in view of molding performance. The above properties are all measured by gel permeation chromatography (hereinafter abbreviated as GPC).

For the surface layer (1) of the invention, a copolymer (b) obtained by hydrogenating the copolymer comprising a conjugated diene and a vinyl aromatic compound may be used. Namely, the above copolymer (a) comprising a conjugated diene and a vinyl aromatic compound may be hydrogenated. As the copolymer (b), there may be, for example, mentioned a styrene-ethylene-butadiene block hydrogenated copolymer, a styrene-ethylene-butadiene block-styrene hydrogenated copolymer, a styrene-isoprene-butadiene block hydrogenated copolymer, a styrene-isoprene-butadiene block-styrene hydrogenated copolymer, and the like.

As the a combined resin (c) of: a hydrogenated product of a copolymer comprising a conjugated diene and a vinyl aromatic compound; and an α-olefin copolymer, there may be, for example, mentioned a polymer having polystyrene at one terminal end, a crystalline component structure of polyethylene at an opposite terminal end, and an α-olefin copolymer therebetween, and the polymer may be DYNARON 4600P from JSR Corp.: styrene-ethylenebutylene-olefin crystalline block copolymer or the like.

With the combined resin (c) to be used for the surface layer (1) of the invention, an ethylene-α-olefin copolymer or a branched low-density polyethylene may be Inked in order to increase the firmness of the film and suppress the stickiness of the film. Usually, these mixing material may be used with the combined resin (c) so that the mixing material is 50% by weight or less of the total amount of the combined resin (c) and the mixing material but the mixing ratio is not particularly limited. Namely, the surface layer (1) of the invention may contain (d) a mixture of: a combined resin of: a hydrogenated product of a copolymer comprising a conjugated diene and a vinyl aromatic compound; and an α-olefin copolymer, and an ethylene-α-olefin copolymer, and/or (e) a mixture of a combined resin of: a hydrogenated product of a copolymer comprising a conjugated diene and a vinyl aromatic compound; and an α-olefin copolymer; and a branched low-density polyethylene.

In the case that the surface layer (1) for use in the invention contains the combined resin (c) and the mixture (d) or in the case that the layer contains the combined resin (c) and the mixture (e), the total of the combined resin of a hydrogenated product of a copolymer comprising a conjugated diene and a vinyl aromatic compound and an α-olefin copolymer may be contained in an amount of 50% by weight or more relative to the total amount of the mixture.

In the invention, the other resin may be added to one surface layer (1) in the range of 50% by weight or less. The resin to be added is not particularly limited but a polystyrene-based resin is preferred in view of the sealing property and film rigidity.

As the polystyrene-based resin, there may be mentioned homopolymers of styrene-based compounds; copolymers of two or more styrene-based compounds; rubber-modified styrene resins obtained by dispersing a rubbery polymer in matrices formed of the styrene-based compounds; and the like. They may be used singly or mixtures of two or more thereof may be suitably used. Of these, it is preferred to use a homopolymer of styrene.

As specific examples of the copolymers of two or more styrene-based compounds, in addition to styrene, there may be mentioned o-methylstyrene, p-methylstyrene, m-methylstyrene, α-methylstyrene, ethylstyrene, α-methyl-p-methylstyrene, 2,4-dimethylstyrene, monochlorostyrene, p-methylstyrene, p-tert-butylstrene, α-ethylstyrene, and the like. They may be used singly or two or more thereof may be used in combination.

The process for producing the polystyrene-based resin is not particularly limited and there may be mentioned bulk polymerization, solution polymerization, emulsion polymerization, suspension polymerization, and the like. Moreover, as a stereochemical structure of the molecule of the polystyrene-based resin, there may be mentioned atactic, isotactic, syndiotactic, and the like structures and any structure may be suitable used. The above polystyrene-based resin has a melt flow rate (hereinafter referred to as MFR) of preferably 2 to 50 g/10 min., more preferably 3 to 20 g/10 min. in view of extrusion property.

The process for polymerization for the above rubber-modified styrene resin is not particularly limited and the resin is generally obtained by dissolving a rubbery polymer in a styrene-based compound monomer, carrying out bulk polymerization, bulk suspension polymerization, or solution polymerization under stirring, followed by precipitation of the rubbery polymer and conversion into particles. Moreover, as the above rubbery polymer, there may be mentioned polybutadiene, styrene-butadiene copolymers, polyisoprene, butadiene-isoprene copolymers, ethylene-propylene copolymers, and the like. Polybutadiene and styrene-butadiene copolymers are preferred and partially hydrogenated products thereof are further preferred.

As the rubber-modified styrene resin, there may be mentioned copolymers of a styrene unit and a methacylate ester unit, copolymers of a styrene unit and alkyl acrylate unit, copolymers having polybutadiene or a styrene-butadiene copolymer as a dispersed phase and a continuous phase containing styrene-methacrylate ester as a main component. The above rubber-modified styrene resin is not particularly limited but MFR is preferably from 2 to 50 g/10 min., more preferably from 3 to 20 g/10 min.

In the case that a polystyrene-based resin is added to the surface layer (1) of the multilayer film of the invention, the total amount of the styrene component in the surface layer (1) is preferably 60% by weight or more, more preferably 65% by weight or more, particularly preferably from 75 to 93% by weight. When the styrene content in the surface layer (1) falls within this range, a sealing property with a tray having the surface layer containing the polystyrene-based resin may be improved. Moreover, by adjusting the amount of the styrene component to the above range, effects of enhancing the sliding property with a mechanical device and improving stability in film formation are obtained without remarkable decrease of transparency at film formation.

The presence of a gel component is necessary in the multilayer film of the invention. In the invention, the gel component means a component which is formed from a high-molecular-weight component of the resin, a crosslinked component, or the like and is not dissolved in a solvent even when dissolution is attempted.

When such a gel component is present, it is known in the art that a thermal shrinking property is excellent but a heat-sealing property decreases (JP-A-2-99526). However, in the invention, it has been found that a sealing property, particularly even when intervening materials such as water, oil and meat juice are present on the sealing surface, sure sealing at the time of sealing, after sealing during transportation, after transportation, after storage, or the like is achieved by specifying a resin constituting the surface layer (1) and specifying gel fraction of the whole film.

The gel fraction of the multilayer film of the invention is necessarily from 0.5 to 50% by weight, preferably from 1 to 45% by weight, more preferably from 2 to 40% by weight in view of sealing strength in the presence of the intervening materials and in view of stretching property at film formation. Particularly, in the case that much attachment of the intervening materials occurs during the packaging step and thus sealing is difficult, the sealing property can be further enhanced by controlling the gel fraction of the whole film to the above range and also controlling the gel fraction of the surface layer (1) to preferably from 0.5 to 15% by weight, more preferably from 1 to 12% by weight, further preferably from 1.5 to 8% by weight. The control of the gel fraction of the surface layer (1) to this range increases the viscosity of the sealing layer at a high temperature and thus breakage of the surface layer (1) can be prevented, so that a good sealing property can be obtained even in a state that the intervening materials are present.

The multilayer film of the invention necessarily has a thickness of 70 µm or less and preferably has 50 µm or less, more preferably 40 µm or less. The control of the thickness to 70 µm or less enhances durability of a film-cutting blade when the film is loaded on a packaging machine in the case of long-run packaging. Moreover, in order to prevent tear of the film during transportation, the thickness of the film is preferably 5 µm or more, more preferably 8 µm or more.

The tensile modulus in the invention is a value represented by a numerical term as 2% modulus (modulus calculated from the stress when strain is 2%). In view of a recovering property of the film after packaging, storage, and transportation and especially in view of the sealing property in the case of packaging of a heaped article where a content is higher than the container, the tensile modulus of the multilayer film of the invention is necessarily in the range of 40 to 300 MPa, preferably from 45 to 250 MPa, more preferably from 50 to 230 MPa in any direction.

The thermal shrinkage ratio of the multilayer film of the invention at 200° F. is necessarily from 15 to 75%, preferably from 15 to 60%, more preferably from 18 to 50% in any direction in view of wrinkle generation after packaging and especially in view of the sealing property in the case of packaging of a heaped article where a content is higher than the container. At the time when top-seal packaging is conducted using the multilayer film of the invention, in order to remove wrinkles of the film of a packaged body to result in a good package appearance, the packaged body is heated to about 200° F. after packaging. Therefore, it becomes necessary to define the thermal shrinkage ratio of the multilayer film at 200° F.

The state that the film surface is raised at the time of top-sealing refers to a to-seal packaging form where the height of the article to be packaged is higher than the inner height of the tray. The multilayer film of the invention can be usefully employed even when the height of the article to be packaged is higher than the inner height of the tray. The multilayer film of the invention is effective especially for the case of a raise of 5 mm or more (in the case that the height of the article to be packaged is 5 mm or more higher than the inner height of the tray) and can be usefully employed even when the raise is 10 mm or more. In the case that the content is a raw meat, the film can be usefully employed even when the raise is 20 mm or more.

In the multilayer film of the invention, the resin to be used for the surface layer (2) preferably contains 50% by weight or more of at least one selected from the group consisting of: a high-density polyethylene, a medium-density polyethylene; a branched low-density polyethylene; an ethylene-α-olefin copolymer, a metal partially neutralized product of ethylene-methacrylic acid copolymer; an ethylene-vinyl acetate copolymer; a polypropylene-based polymer; and a polypropylene-based terpolymer in view of stability in film formation.

Among them, in view of stability in long-run film formation and antitear performance at the transportation of a packaged body, the resin more preferably contains an ethylene-α-olefin copolymer, a branched low-density polyethylene, and a mixture of an ethylene-α-olefin copolymer and a branched low-density polyethylene. The ethylene-α-olefin copolymer is a random copolymer of ethylene and at least one monomer selected from α-olefins having 3 to 18 carbon atoms. As the α-olefins, there may be mentioned propylene, butene-1, penten-1, 4-methyl-pentene-1, hexene-1, octene-1, decene-1, dodecene1, and the like.

The ethylene content in the ethylene-α-olefin copolymer is preferably from 40 to 95% by weight, more preferably from 50 to 90% by weight, further preferably from 60 to 85% by weight. The process for polymerizing ethylene and the α-olefin is not particularly limited but a polymerization process using a multisite catalyst, a single site catalyst, or the like may be mentioned. In the case that a content requiring transparency is packaged, the use of the copolymer polymerized with a single site catalyst is preferred. In that case, when the polymer having a molecular weight distribution (Mw/Mn) of 3.5 or less measured by GPC is used, transparency is especially becomes better and thus the case is preferred.

The high-density polyethylene for use in the surface layer (2) of the invention is a homopolymer of ethylene or a copolymer of ethylene and 5% by mol or less of 1-olefin monomer and is a resin having a density of 0.942 g/cm³ or more.

The medium-density polyethylene for use in the surface layer (2) of the invention is a resin having a density of 0.930 g/cm³ or more and 0.942 9/cm³ or less among the above homopolymer or the above copolymer.

The density of the ethylene-α-olefin copolymer for use in the surface layer (2) of the invention is preferably from 0.870 to 0.925 g/cm³. When the density is 0.870 g/cm³ or more, firmness of the film increases and a traveling property on a packaging machine is improved. When the density is 0.925 g/cm³ or less, the transparency becomes better.

The density of the branched low-density polyethylene for use in the surface layer (2) of the invention is preferably from 0.908 to 0.925 g/cm³. When the density is 0.908 g/cm³ or more, firmness of the film increases and a traveling property on a packaging machine is improved. When the density is 0.925 g/cm³ or less, the transparency becomes better.

The MFR of the ethylene-vinyl acetate copolymer for use in the surface layer (2) is preferably from 0,3 to 5.0 g/10 min, more preferably from 0.5 to 3.5 g/10 min. in view of an extrusion property. The content of the vinyl acetate is preferably from 5.5 to 20.0% by weight, more preferably from 5.5 to 16.0% by weight in view of an antitear property of the film and in view of prevention of smell of acetic acid.

As the polypropylene-based polymers for use in the surface layer (2), there may be mentioned a homopolymer, random copolymers with ethylene or butene, and the like. Of these, in view of package appearance, a copolymer with ethylene or butene is preferred. The polypropylene-based terpolymer means a ternary copolymer of ethylene-butene-propylene or ethylene-propylene-diene where propylene is a main component.

The metal partially neutralized product of the ethylene-methacrylic acid copolymer refers to a thermoplastic resin obtained by partially neutralizing a copolymer of ethylene and methacrylic acid with sodium or an ion of a polyvalent metal such as zinc, wherein the polymer chains are combined with each other through an ionic bond.

The above resin for use in the surface layer (2) may be contained in the surface layer (2) in an amount of 50% by weight or more. The other resin(s) accounting for the remaining 50% by weight or less is not particularly limited and any resin may be employed.

Moreover, in the invention, at least one layer of a third layer is preferably present between the first layer (1) and the surface layer (2). The third layer preferably contains 50% by weight or more of at least one selected from the group consisting of: a copolymer comprising a conjugated diene and a vinylaromatic compound; an ethylene-vinyl acetate copolymer; an ethylene-methylmethacrylic acid copolymer; a metal partially neutralized product of ethylene-methacrylic acid copolymer; an ethylene-acrylic acid copolymer; an ethylene-ethylacrylic acid copolymer, an ethylene-maleic anhydride copolymer, an ethylene-ethylene arylate-maleic anhydride copolymer; an ethylene-maleic acid modified resin; an ethylene-α-olefin copolymer having a Vicat softening temperature of 50 to 68° C.; a polypropylene-based polymer; and a polypropylene-based terpolymer. The use of the resin selected therefrom enables prevention of interlayer peeling of the multilayer film during packaging step especially at the time when a highly heaped content is subjected to top-seal. In view of an extrusion property, MFR of the third layer is preferably from 0.3 to 5.0 g/10 min., more preferably from 0.5 to 3.5 g/10 min.

As far as the third layer contains 50% by weight or more of the above resin(s), the other resin(s) accounting for the remaining 50% by weight or less is not particularly limited and any resin may be employed.

Since the multilayer film of the invention is prevented from tear and a good package appearance is obtained, the film preferably contains at least one additive selected from the group consisting of: a glycerin; a fatty acid; a polyhydric alcohol fatty acid ester, a talc; an oleate salt, an amide-based lubricant; and a mineral oil having a number-average molecular weight of 250 to 480.

The above additives exhibit an effect of imparting lubricity to the film and preventing the film from getting held up by a part of a packaging machine to be torn in the case that the packaging speed is high during the packaging step. Moreover, the additives also exhibit an effect of improving lubricity between the film and the tray and thus preventing the film to be torn during transportation at the time when a relatively heavy packaged body is transported after packaging. Furthermore, they also exhibits an effect of improving a mouth-opening property at the time when a tubular parison is formed and enhancing lubricity with a mechanical device to improve stability in film formation. From these viewpoints, the above additives are preferably added to the whole of the surface layer (1) and/or surface layer (2) in an amount of 10% by weight or less.

As the above fatty acid for use in the invention, there may be, for example, mentioned capric acid, coconut oil fatty acids, oleic acid, sunflower oil fatty acids, caproic acid, and the like.

As the polyhydric-alcohol fatty acid esters, there may be, for example, mentioned glycerin fatty acid esters, diglycerin fatty acid esters, polyglycerin fatty acid esters, and the like and any of them may contribute to defogging property and stability in film formation. In view of stability in film formation, defogging property, and the like, the amount of the polyhydric alcohol fatty acid ester to be added is preferably from 0.5 to 7% by weight, more preferably from 0.7 to 5% by weight relative to the whole of the surface layer (1) and/or surface layer (2). In the case of carrying out printing, the amount is preferably from 0.8 to 3% by weight in view of ink peeling.

As the oleate salt, there may be mentioned sodium oleate, calcium oleate, potassium oleate, and the like. In view of stability in film formation of the film, sodium oleate is particularly preferred.

As the amide-based lubricant, there may be mentioned erucic amide, oleic amide, stearic amide, and the like. In order to satisfy both of transparency and lubricity at the same time, the amount of the amide-based lubricant to be added is preferably from 0.1 to 2% by weight relative to the whole of the surface layer (1) and/or surface layer (2).

In the case that mineral oil is used in the invention, the number-average molecular weight is preferably from 250 to 480. When the number-average molecular weight is 250 or more, an effect of contributing to stability in film formation is high. When it is 480 or less, stability in film formation is good and sealing strength is enhanced.

Since these additives have different optimum values depending on conditions for film formation, one kind or two or more kinds of the additives can be selected from the above substances, if necessary.

The multilayer film of the invention is most suitable for the top-seal packaging method in a state that an article to be packaged is heaped from the tray, the film can be satisfactorily used in an application of a tray having a surface layer containing a polystyrene resin, which uses, for example, a poultry raw meat as a content. Currently, at markets, supermarkets and the like, poultry raw meats are placed on sale in forms of overlap or pillow-shrink packaging of foam polystyrene trays with packaging films. In the case that these articles to be packaged are packaged by top-seal packaging, since meat oil or water is apt to attach to a circumferential edge part of the tray during the packaging step, a sealing property, especially a sealing property in the case that the content is heaped becomes important. Since the use of the multilayer film of the invention can solve these problems, the multilayer film of the invention is most suitable in the above application.

Since the packaged body wherein a tray having a surface layer containing a polystyrene-based resin is subjected to top-seal with the multilayer film of the invention is satisfactory in sealing property, especially intervening material sealing property, liquid is not leaked from the packaged body and tearing of the film can be prevented even during refrigeration and transportation under freezing.

In the case that the content is a raw meat, especially a poultry raw meat, a large amount of a liquid containing blood exuded from the meat as a main component may present. The use of the top-sealed packaged body of the invention enables prevention of liquid leakage to outside the packaged body during storage, during transportation, and after transportation even when an impact induced at handling is imparted.

The following will describe examples of the process for producing the multilayer film of the invention.

The film of the invention is formed with stretching by a single bubble inflation method, a double bubble inflation method, a triple bubble inflation method, a tenter method, or the like, but in view of a shrinking property, a single bubble inflation method, a double bubble inflation method, or a triple bubble inflation method is preferred and a double bubble inflation method is more preferred.

Specifically, raw materials to be used for each of the above surface layer (1), surface layer (2), and third layer are melted in several kinds of extrusion machines, individual melted resins are introduced into a ring die after the individual melted resins are passed through a screen changer and a polymer pipe, the melted resins forming individual layers are sequentially or simultaneously laminated inside the ring die, the laminated resins are circularly co-extruded from the ring die, whereby a tubular unstretched raw film (tubular parison) is obtained. Then, the tubular parison thus obtained is cooled by the following method.

As the method of cooling the tubular parison, there may be, for example, mentioned a method of cooling the parison from the outside using water as a cooling medium and a method of rapidly cooling and solidifying the parison wherein the tubular parison is cooled from both of inside and outside thereof by cooling the parison from the outside using water as a cooling medium and also bringing the inside of the tubular parison into contact along a cooling mandrel (water is passed through the inside of the mandrel) whose surface has been roughened by a blasting treatment. In the invention, any of the methods may be employed.

The position to which the cooling mandrel is placed is important for controlling the thickness of the parison. In view of operationality and thickness control, it is preferred to place the edge part of the cooling mandrel at a position from 10 to 70 mm preferably from 20 to 60 mm apart from the ring die face of the above ring die. The length of the cooling mandrel is preferably from 150 to 300 mm in view of operationality and cooling capacity. The diameter of the cooling mandrel is preferably from 1.0 to 1.7 times, preferably from 1.05 to 1.35 times the diameter of the ring die lip of the above ring die in view of operationality and cooling capacity.

During cooling or after cooling and solidifying the parison, at least one kind of the additives selected from the group consisting of glycerin, fatty acids, polyhydric alcohol fatty acid esters, oleate salts, silicon-based lubricants, and mineral oils having a number-average molecular weight of 250 to 480 is preferably applied to the inside of the tubular parison. As the applying method, there may be mentioned a method of applying the substance from the inside or outside of the tubular parison by spraying, a method of applying a certain amount of the substance solution by placing the solution inside the tubular parison and squeezing the solution with a roller, and the like method. In the case of using the spraying method, a method of applying the substance from the inside is operationally simple and hence is preferred.

Then, stretching is conducted by introducing the cooled and solidified tubular parison into a stretching machine and injecting air between nip rollers having a difference in speed while a stretch-starting point is heated between 70 to 140° C. In view of stretch stability, stretching is conducted in each direction of the machine direction (MD) and the transverse direction (TD) so that stretching magnification is preferably from 1.5 to 10, more preferably from 2 to 7. In this connection, the stretch-starting point refers to the position where the TD direction of the parison begins to blow up by inner pressure of bubble.

By controlling the stretch-starting temperature to 70 to 140° C. and stretching magnification to from 1.5 to 10 in either direction of MD and TD directions, a film having a tensile modulus of 40 to 300 MPa in any direction and a thermal shrinkage ratio at 200° F. of 15 to 75% in any direction can be obtained.

In view of stability in long-run film formation, sealing property, especially intervening material sealing property, and heat resistance, the tubular parison may be subjected to a crosslinking treatment with electron beam. The crosslinking treatment with electron beam may be conducted in either step, i.e., before or after stretching but it is preferred to conduct the treatment before stretching since a relatively small apparatus for crosslinking treatment can be employed.

In view of sealing property at the time when intervening materials are present between the tray and the film and stability in stretching, the film of the invention is preferably irradiated with electron beam at 15 to 150 kGy, more preferably at 25 to 120 kGy so that the gel fraction of the whole film becomes from 0.5 to 50% by weight. For producing the gel component, there may be mentioned a method of adding a crosslinking agent into the multilayer film and chemically producing crosslinking points and the like method. In this case, however, there is a case that a crosslinking reaction starts in an extruding machine and thus an extruding performance decreases. Therefore, it is preferred to subject the tubular parison after extrusion or the film after stretching to the above treatment with electron beam to form the gel component.

The irradiation with electron beam may be applied to the tubular parison in a wholly transmitted manner. Particularly, in the case that it is necessary to seal a tray where a considerable amount of intervening materials such as oil and meat juice are present on the sealing surface and hence a strong intervening material sealing property is necessary, it is preferred to apply electron beam from the surface layer (1) side. The irradiation from the surface layer (1) side facilitates control of the gel fraction in the surface layer (1) and the intervening material sealing property at sealing can be enhanced.

When the above film after stretching is subjected to a surface treatment such as a corona treatment, an ozone treatment, or a flame treatment, a film also suitable for a printing application is obtained and hence the treatment is preferred. The resulting raw film is subjected to a slit processing into a prescribed size to obtain a packaging film.

Moreover, into the multilayer film of the invention, an antioxidant, a plasticizer, or the like may be added in an amount not impairing original properties. Furthermore, a petroleum resin may be contained in the multilayer film of the invention, and a high-pressure-process low-density polyethylene and the like may be incorporated as a processing aid into a layer which requires it in a range not impairing original properties. In the case of using a hydrogenated petroleum resin [ARKON (Arakawa Chemical Industries, Ltd.: trade name)] or a hydrogenated terpene resin [CLEARON (Yasuhara Chemical Co., Ltd.: trade name)], the content is preferably from 0.1 to 10% by weight relative to the whole multilayer film since shrinking property and transparency are satisfactory.

EXAMPLES

The present invention is now illustrated in greater detail with reference to Examples and Comparative Examples, but it should be understood that the present invention is not to be construed as being limited thereto. In this connection, individual physical properties in the invention were measured according to the following methods.

(1) Elastic Modulus

The elastic modulus was determined in accordance with JIS-K7127.

(2) Thermal Shrinkage Ratio

The thermal shrinkage ratio was represented as a percent ratio of a value obtained by placing a 100 mm-square film in an air-oven-type high-temperature chamber set at 200° F., determining a shrinkage of the film after 1 minute of heat treatment, and dividing the shrinkage by the original size. The thermal shrinkage ratio is an average value of the thermal shrinkage ratios obtained by setting arbitrary three points on the resulting film in the TD direction and determining thermal shrinkage ratio at each point by the above method.

(3) Measuring Method of Gel Fraction

A film was extracted in a boiling p-xylene for 12 hours, the whole was filtered through a mesh having a 150 mesh size, weight of an insoluble part was measured, and the ratio was represented according to the following equation.

Gel fraction (% by weight)=(Weight of insoluble part after extraction/Weight of film before extraction)×100

(4) Vicat Softening Temperature

The Vicat softening temperature was determined in accordance with JIS-K7206.

(5) Content of Styrene in Surface Layer (1)

The content of styrene was determined by ultraviolet spectrophotometry. In the case of using a copolymer comprising a hydrogenated conjugated diene and a vinyl aromatic compound, the content can be determined by a nuclear magnetic resonance apparatus method (NMR method).

(6) MFR of Resin Used

1) Compound Including Polystyrene-based Resin, Copolymer Comprising Conjugated Diene, and Vinyl Aromatic Compound:
   MFR was determined in accordance with JIS-K6871.
2) Ethylene-vinyl Acetate Copolymer:
   MFR was determined in accordance with JIS-K6730.

(7) Content of Vinyl Aromatic Compound in Copolymer Comprising Conjugated Diene and Vinyl Compound Using an NMR method, $^1$H-NMR spectra [$^1$H single pulse method (45° pulse is used for $^1$H)] and $^{13}$C-NMR spectra [$^1$H decoupling method for $^{13}$C gate (45° pulse is used for $^{13}$C)] are determined by a nuclear magnetic resonance apparatus method using an apparatus: VARIAN INOVA AS600 in accordance with the method described in RUBBER CHEMISTRY AND TECHNOLOGY 54, 685 (1981). The content can be determined based on these values.

(8) Weight-average Molecular Weight and Molecular Weight Distribution (Mw/Mn)

1) Weight-average Molecular Weight and Molecular Weight Distribution in Copolymer Comprising Conjugated Diene and Vinyl Compound:
   Using GPC (GPC apparatus HLC-8020 Model (trademark) manufactured by Tosoh Corporation), measurement was performed under conditions of a column temperature of 40° C., a flow rate of 1 ml/min, and a concentration of 3 mg/ml using columns of TSK series manufactured by Tosoh Corporation and tetrahydrofuran as a solvent. The weight-average molecular weight and molecular weight distribution (Mw/Mn) were determined based on the weight-average molecular weight (Mw) and number-average molecular weight (Mn) obtained by conversion from a constitutional curve with standard polystyrenes.
2) Weight-average Molecular Weight and Molecular Weight Distribution of Polyethylene-based Resin:
   Using GPC (GPC apparatus 150C Model manufactured by Nihon Waters K.K.), measurement was performed under conditions of a temperature of 135° C., a flow rate of 1 ml/min and a concentration of 10 mg/10 mL using a column of TSK GMH-6 manufactured by Tosoh Corporation and o-dichlorobenzene (ODCB) as a solvent. The weight-average molecular weight and molecular weight distribution (Mw/Mn) were determined based on the weight-average molecular weight (Mw) and number-average molecular weight (Mn) obtained by conversion from a constitutional curve with standard polystyrenes.

(9) Density of Polyethylene-based Resin

The density was determined in accordance with JIS-K6760.

(10) Evaluation Method of Package Appearance of Multilayer Film

At a central part of a polystyrene foam tray having a longitudinal length of 220 mm, a transverse length of 160 mm, and a height of 20 mm, an article to be packaged (one wherein a polystyrene foam having a longitudinal length of 100 mm, a transverse length of 50 mm, and a height of 20 mm was placed on a piece of wood having a longitudinal length of 100 mm, a transverse length of 50 mm, and a height of 50 mm) Was placed. After chicken meat juice was applied once on a circumferential edge part of the tray with gauze, top-seal packaging was conducted using the multilayer film of each of Examples and Comparative Example. Thereafter, the multilayer film at a position 20 mm apart from the central part of the circumferential edge part in the transverse direction toward the center of the packaging film was shoved in a depth of about 20 mm with a piece of wood having a diameter of 10 mm. After 5 minutes, a state of generation of slacks and wrinkles was evaluated. Evaluation standard was as follows:

A: a condition where a shoving imprint is completely recovered and no slacks and wrinkles are observed.

B: a condition where a shoving imprint slightly remains and slacks and wrinkles are observed.

C: a condition where about 10 mm of a circular or elliptic shoving imprint strongly remains and a large number of slacks and wrinkles are present at the part and the surrounding part thereof.

(11) Evaluation Method of Intervening Material Scaling Property of Multilayer Film A packaged body was produced in the same manner as the method used in (10), the packaged body produced was put into a vessel in which water had been placed, the packed body was pushed and an inner lid was got on the body to immerse it in water, a lid was further got on the vessel, the pressure in the capped vessel was reduced to 300 mmHg, and sealing property was evaluated by the fact whether water penetrates inside the packaged body or not. The evaluation standard was as follows:

A: sealing property is satisfactory at the entire circumferential edge part of the tray and no water penetrates inside the packaged body.

C: water penetrates inside the packaged body since the circumferential edge part of the tray springs a leak in part or has insufficiently sealed spot(s).

(12) Evaluation on Film Tear

In a polystyrene foam tray having a longitudinal length of 200 mm, a transverse length of 150 mm, and a height of 20 mm, five pieces of deep-fried foods (tempura) were placed. After an oil for deep-fried foods was applied on a surrounding part of the tray, top-seal packaging was conducted, the surface layer (I) side of the multilayer film of each of Examples and Comparative Example being a sealing face.

Moreover, about 300 g of a chicken meat was placed in another tray. After a chicken meat oil-water mixed liquid (obtained by mixing a drip liquid of a chicken meat commercially available as a tray pack with water in a ratio of 1:1) was applied on the circumferential edge part of the tray with gauze, top-seal packaging was conducted at 170° C. using the multilayer film of each of Examples and Comparative Example.

In any of the above cases, the height from the upper face of the tray to the highest position of the content was about 20 cm and thus it was a state that the multilayer film was raised.

The two kinds of the packaged bodies obtained in the above were arranged so that they were piled into three layers in respective cardboard boxes, and transported over a distance of about 200 km by truck. After the transportation, each cardboard box was dropped twice from a height of 1 m and a condition of sealing, film tear, a condition of wrinkles generated on the film, and a condition of liquid leakage from the inside of the top-seal packaged body to the outside of the packaged body were visually confirmed.

Resins Used in Examples and Comparative Example

Copolymer comprising conjugated diene and vinyl aromatic compound [SB1: STYROFLEX 2G66 (BASF)]:

A copolymer derived from butadiene as a conjugated diene and styrene as a vinyl aromatic compound and having a weight-average molecular weight of 150,000 and Mw/Mn of 1.3

Copolymer comprising conjugated diene and vinyl aromatic compound [SB2: S. O. E. SS-9000 (Asahi Kasei Chemicals)]:

A copolymer obtained by polymerization of butadiene as a conjugated diene and styrene as a vinyl aromatic compound and successive hydrogenation and having a weight-average molecular weight of 210,000 and Mw/b of 2.2

Combined resin of: hydrogenation product of copolymer comprising conjugated diene and vinyl aromatic compound; and α-olefin copolymer [SB3: DYNARON 4600P (JSR)]:

Styrene content=20%, M=5.6 g/10 min

Polyethylene-based resin (PE1):

α-olefin=hexene-1, density=0.905 g/cm$^3$, MFR=2.5 g/10 min.

Ethylene-vinyl acetate copolymer (EVA1):

Content of vinyl acetate=15% by weight, MER=1.0 g/10 min

Ethylene-vinyl acetate copolymer (EVA2):

Content of vinyl acetate=6% by weight, MFR=2.5 g/10 min.

Polypropylene-based terpolymer [PP1: ADSYL 5C37F (Sun Allomer Ltd.)]:

A propylene-ethylene-butene copolymer, 5.5 g/10 min.

Polypropylene-based resin [PP2: ADFLEX C200F (Sun Allomer Ltd.)]:

A propylene-ethylene copolymer, MFR=7.0 g/10 min.

Polystyrene-based resin (PS1):

A styrene homopolymer, MFR=15 g/10 min.

Example 1

Using three extruders, a three-kinds three-layer parison was extruded, wherein SB1 was charged into an extruder for a surface layer (1), PE1 was charged into an extruder for a surface layer (2), EVA1 was charged into an extruder for an intermediate layer (a third layer), and further an inner die-adhesion-type ring die was used.

The resulting tubular parson was cooled from the parison outside using water as a cooling medium and also from the parison inside by bringing the parison inside into contact along a cooling mandrel whose inside is passed through by water and whose surface has been roughened by a blasting treatment, whereby a tubular parison having a width of 180 mm and a thickness of 400 μm was formed through cooling and solidification from both of the inside and outside of the tubular parison.

The tubular parison was introduced into an electron beam-irradiating apparatus and was irradiated with electron beam from the surface layer (1) side to effect a crosslinking treatment so that an absorbed dose reached 80 kGy.

The parison after the crosslinking treatment was introduced into a stretching machine and re-heated, and then the parison was passed between two pairs of differential nip rollers and air was injected to form a bubble. The temperature around stretch-starting point was about 98° C. The bubble was stretched 5 times in the longitudinal direction and 4 times in the transverse direction to obtain a multilayer film having a thickness of about 20 µm by means of a winding machine.

At the time when the film was wound up by means of the winding machine, the film was cut into a size of a width of 535 mm under cutting the both ends, and two sheets of the film were respectively handled as one sheet of film. The respective films were wound up 200 m each on paper tubes fitted to two winding axes of the winding machine, the films being used as a multilayer film for evaluation.

Example 2

Except that SB2 was charged into the extruder for a surface layer (1), the same operations as in Example 1 were conducted to obtain a film having a thickness of about 20 µm.

Example 3

A resin mixture obtained by mixing SB1 and PS1, was charged into the extruder for a surface layer (1). The resin was mixed so that the styrene content of the surface layer (1) became 76% by weight. The mixing ratio was as follows: SB1:PS1=70% by weight:30% by weight. Except the above, the same operations as in Example 1 were conducted to obtain a film having a thickness of about 20 µm.

In this connection, the styrene content of the surface layer (1) in the present Example was 76% by weight.

Example 4

SB3 (70% by weight)+PE1 (30% by weight) was charged into the ertruder for a surface layer (1). Sodium oleate was introduced into a tube of the tubular parison so as to wet the inside in a circumferential direction and a certain amount thereof was applied by squeezing it with a pinch roller. The tubular parison was introduced into an electron beam-irradiating apparatus and was irradiated with electron beam from a surface layer (2) side to effect a crosslinking treatment so that an absorbed dose reached 80 kGy.

Example 5

Except that PP1 was charged into the extruder for a surface layer (2), the same operations as in Example 1 were conducted to obtain a film having a thickness of about 20 µm.

Example 6

Except that PP2 was charged into the extruder for a surface layer (2) and PP1 (20% by weight)+EVA2 (80% by weight) was charged into the extruder for an intermediate layer, the same operations as in Example 1 were conducted to obtain a film having a thickness of about 20 µm.

Example 7

Except that 1.5% by weight of diglycerin fatty acid ester was incorporated into the material (PE1) constituting the surface layer (2), the same operations as in Example 1 were conducted to obtain a film having a thickness of about 20 µm.

Example 8

Except that 0.5% by weight of talc [TALC PKP81 (Fuji Talc Kogyo K. K.)] was incorporated into the material (SB1) constituting the surface layer (1) and 1.5% by weight of diglycerin fatty acid ester was incorporated into the material PE1) constituting the surface layer (2), the same operations as in Example 1 were conducted to obtain a film having a thickness of about 20 µm.

Example 9

Using SB2 as the surface layer (1) and PP1 as the surface layer (2), a film was obtained by double bubble inflation method. Using an inner die-adhesion-type ring die as a die, a parison was extruded. The resulting tubular parison was cooled from the parison outside using water as a cooling medium and also from the parison inside by bringing the parison inside into contact along a cooling mandrel whose inside is passed through by water and whose surface has been roughened by a blasting treatment, whereby a tubular parison having a width of 180 mm and a thickness of 350 µm was formed through cooling and solidification from both of the inside and outside of the tubular parison.

The tubular parison was introduced into an electron beam-rating apparatus and was irradiated with electron beam from the surface layer (1) side to effect a crosslinking treatment so that an absorbed dose reached 35 kGy.

The parison after the crosslinking treatment was introduced into a stretching machine and re-heated, and then the parison was passed between two pairs of differential nip rollers and air was injected to form a bubble. The temperature around stretch-starting point was about 110° C. The bubble was stretched 5 times in the longitudinal direction and 4 times in the transverse direction to obtain a multilayer film having a thickness of about 18 µm by means of a winding machine.

At the time when the film was wound up by means of the winding machine, the film was cut into a size of a width of 535 mm under cutting the both ends and two sheets of the film were respectively handled as one sheet of film. The respective films were wound up 200 m each on paper tubes fitted to two winding axes of the winding machine, the films being used as a multilayer film for evaluation.

Comparative Example 1

Except that the crosslinking treatment with electron beam was not conducted in Example 9, the same operations as in Example 9 were conducted and thereby it was attempted to obtain a film having a thickness of about 18 µm. Table 1 shows the results obtained in Examples 1 to 9 and Comparative Example 1. In this connection, "ND[1]" in the table means that evaluation is impossible since a sealing property is bad and thus the product is intolerable for transportation.

TABLE 1

|  |  | Example 1 | Example 2 | Example 3 | Example 4 | Example 5 | Example 6 | Example 7 | Example 8 | Example 9 | Comparative Example 1 |
|---|---|---|---|---|---|---|---|---|---|---|---|
| Resin | Surface layer (1) | SB1 | SB2 | SB1 PS1 | SB3 PE1 | SB1 | SB1 | SB1 | SB1 | SB2 | SB2 |
|  | Intermediate layer | EVA1 | EVA1 | EVA1 | EVA1 | EVA1 | PP1 EVA2 | EVA1 | EVA1 | — | — |
|  | Surface layer (2) | PE1 | PE1 | PE1 | PE1 | PP1 | PP2 | PE1 | PE1 | PP1 | PP1 |
| Gel fraction (wt %) |  | 35 | 30 | 28 | 41 | 21 | 16 | 32 | 33 | 3 | 0.2 |
| Elastic modulus (MPa) | Machine direction | 80 | 90 | 225 | 110 | 90 | 130 | 80 | 80 | 90 | 90 |
|  | Transverse direction | 60 | 60 | 160 | 70 | 70 | 80 | 60 | 60 | 80 | 80 |
| Thermal shrinkage ratio (%) (200° F.) | Machine direction | 28 | 31 | 20 | 24 | 21 | 19 | 27 | 28 | 16 | 15 |
|  | Transverse direction | 51 | 48 | 40 | 42 | 38 | 34 | 53 | 52 | 28 | 22 |
| Evaluation results | Film forming property | good | good | good | good | good | good | good | good | good | good |
|  | Package appearance | A | A | A | A | A | A | A | A | A | A |
|  | Intervening material sealing property | A | A | A | A | A | A | A | A | A | C |
|  | Antitear property | good | good | good | good | good | good | good | good | good | ND[1] |
|  | Remarks |  |  | Styrene content in surface layer (1): 76 wt % | Sodium oleate |  |  | Diglycerin fatty acid ester: 1.5 wt % | Diglycerin fatty acid ester: 1.5 wt % Talc: 0.5 wt % |  |  |

While the present invention has been described in detail and with reference to specific embodiments thereof, it will be apparent to one skilled in the art that various changes and modifications can be made therein without departing from the spirit and scope thereof.

The present application is based on Provisional Application No. US60/719,589 filed on Sep. 23, 2005, and Japanese Patent Application No. 2005-265763, filed on Sep. 13, 2005, and the contents thereof are incorporated herein by reference.

What is claimed is:

1. A packaged body comprising:
   a tray having a surface layer containing a polystyrene-based resin; and
   a multilayer film to top seal the tray such that the multilayer film is attached only to a peripheral edge part of the tray after a product has been loaded into the tray, the multilayer film comprising at least a first layer and a second layer,
   the first layer containing 50% by weight or more of at least one selected from the group consisting of:
   (a) a copolymer comprising a conjugated diene and a vinyl aromatic compound;
   (b) a copolymer resulting from hydrogenation of a copolymer comprising a conjugated diene and a vinyl aromatic compound;
   (c) a combined resin of:
      a hydrogenated product of a copolymer comprising a conjugated diene and a vinyl aromatic compound; and
      an α-olefin copolymer;
   (d) a mixture of:
      a combined resin of:
         a hydrogenated product of a copolymer comprising a conjugated diene and a vinyl aromatic compound; and
         an α-olefin copolymer; and
      ethylene-α-olefin copolymer; and
   (e) a mixture of:
      a combined resin of:
         a hydrogenated product of a copolymer comprising a conjugated diene and a vinyl aromatic compound; and
         an α-olefin copolymer; and
      a branched low-density polyethylene,
   the multilayer film having: a gel fraction of from 0.5 to 50% by weight; a thickness of 70 μm or less; a tensile modulus of from 40 to 300 MPa in an any direction; and a thermal shrinkage ratio at 200° F. of from 15 to 75% in any direction.

2. The packaged body according to claim 1,
   wherein the second layer of the multilayer film contains 50% by weight or more of at least one selected from the group consisting of:
   a high-density polyethylene;
   a medium-density polyethylene;
   a branched low-density polyethylene;
   an ethylene-α-olefin copolymer;
   a metal partially neutralized product of ethylene-methacrylic acid copolymer,
   an ethylene-vinyl acetate copolymer;
   a polypropylene-based polymer; and
   a polypropylene-based terpolymer.

3. The packaged body according to claim 1,
   wherein the multilayer film contains a third layer between the first layer and the second layer, the third layer comprising at least one sublayer containing 50% by weight or more of at least one selected from the group consisting of:
   a copolymer comprising a conjugated diene and a vinylaromatic compound;

an ethylene-vinyl acetate copolymer;
an ethylene-methylmethacrylic acid copolymer;
a metal partially neutralized product of ethylene-methacrylic acid copolymer;
an ethylene-acrylic acid copolymer;
an ethylene-ethylacrylic acid copolymer;
an ethylene-maleic anhydride copolymer;
an ethylene-ethylene acrylate-maleic anhydride copolymer;
an ethylene-maleic acid modified resin;
an ethylene-α-olefin copolymer having a Vicat softening temperature of 50 to 68° C.;
a polypropylene-based polymer; and
a polypropylene-based terpolymer.

4. The packaged body according to claim 2,
wherein the multilayer film contains a third layer between the first layer and the second layer, the third layer comprising at least one sublayer containing 50% by weight or more of at least one selected from the group consisting of:
a copolymer comprising a conjugated diene and a vinylaromatic compound;
an ethylene-vinyl acetate copolymer;
an ethylene-methylmethacrylic acid copolymer;
a metal partially neutralized product of ethylene-methacrylic acid copolymer;
an ethylene-acrylic acid copolymer;
an ethylene-ethylacrylic acid copolymer;
an ethylene-maleic anhydride copolymer;
an ethylene-ethylene acrylate-maleic anhydride copolymer;
an ethylene-maleic acid modified resin;
an ethylene-α-olefin copolymer having a Vicat softening temperature of 50 to 68° C.;
a polypropylene-based polymer; and
a polypropylene-based terpolymer.

5. The packaged body according to claim 1, wherein the first layer of the multilayer film contains a polystyrene-based resin and the sum of styrene component of the first layer is 60% by weight or more.

6. The packaged body according to claim 1,
wherein the multilayer film contains at least one additive selected from the group consisting of:
a glycerin;
a fatty acid;
a polyhydric alcohol fatty acid ester,
a talc;
an oleate salt,
an amide-based lubricant; and
a mineral oil having a number-average molecular weight of 250 to 480.

7. The packaged according to claim 4, wherein the multilayer film contains at least one additive selected from the group consisting of:
a glycerin;
a fatty acid;
a polyhydric alcohol fatty acid ester,
a talc;
an oleate salt,
an amide-based lubricant; and
a mineral oil having a number-average molecular weight of 250 to 480.

8. The packaged body according to claim 1, wherein the first layer of the multilayer film has a gel fraction of from 0.5 to 15% by weight.

9. The packaged body according to claim 2, wherein the first layer of the multilayer film has a gel fraction of from 0.5 to 15% by weight.

10. The packaged body according to claim 4, wherein the first layer of the multilayer film has a gel fraction of from 0.5 to 15% by weight.

11. The packaged body according to claim 6, wherein the first layer of the multilayer film has a gel fraction of from 0.5 to 15% by weight.

12. The packaged body according to claim 7, wherein the first layer of the multilayer film has a gel fraction of from 0.5 to 15% by weight.

13. The packaged body according to claim 1, wherein the tray
is selected from the group consisting of a hard tray and a foam tray,
has a surface layer containing a polystyrene-based resin, and contains at least one of processed foods and poultry raw meats.

14. The packaged body according to claim 1, wherein the packaged body packages at least one of processed foods and raw meats.

* * * * *

UNITED STATES PATENT AND TRADEMARK OFFICE
CERTIFICATE OF CORRECTION

| | | |
|---|---|---|
| PATENT NO. | : 7,923,119 B2 | Page 1 of 1 |
| APPLICATION NO. | : 11/520039 | |
| DATED | : April 12, 2011 | |
| INVENTOR(S) | : Eisuke Suzuki et al. | |

It is certified that error appears in the above-identified patent and that said Letters Patent is hereby corrected as shown below:

In Column 1 on the Title Page of the Issued Patent, please insert the Domestic Priority Data -- This application claims benefit of 60/719,589, filed on 09/23/2005" --

Column 24, Line 7 in Claim 7, after "packaged" insert -- body --.

Signed and Sealed this
Twenty-eighth Day of June, 2011

David J. Kappos
*Director of the United States Patent and Trademark Office*